United States Patent
Scope et al.

(10) Patent No.: US 10,958,991 B2
(45) Date of Patent: *Mar. 23, 2021

(54) FILTER ELEMENT SENSOR MODULE HAVING PROCESSING AND WIRELESS COMMUNICATION CAPABILITIES

(71) Applicant: MANN+HUMMEL GmbH, Ludwigsburg (DE)

(72) Inventors: Andreas Scope, Oberschoena (DE); Brandon Hukill, Holly Springs, NC (US); Karlheinz Muenkel, Oberderdingen-Flehingen (DE); Yew Peng Chong, Singapore (SG)

(73) Assignee: MANN+HUMMEL GmbH, Ludwigsburg (DE)

(*) Notice: Subject to any disclaimer, the term of this patent is extended or adjusted under 35 U.S.C. 154(b) by 408 days.

This patent is subject to a terminal disclaimer.

(21) Appl. No.: 15/705,374

(22) Filed: Sep. 15, 2017

(65) Prior Publication Data

US 2019/0090036 A1    Mar. 21, 2019

(51) Int. Cl.
*G01D 11/26* (2006.01)
*H04Q 9/00* (2006.01)
(Continued)

(52) U.S. Cl.
CPC ............ *H04Q 9/00* (2013.01); *B01D 46/429* (2013.01); *F01M 1/10* (2013.01); *F01M 11/10* (2013.01); *F01P 11/06* (2013.01); *F01P 11/12* (2013.01); *F02M 35/0205* (2013.01); *B01D 46/0086* (2013.01); *F01M 11/03* (2013.01); *F01M 2001/1007* (2013.01); *F01P 11/14* (2013.01); *F01P 2011/061* (2013.01); *F16H 57/0405* (2013.01); *G08B 5/36* (2013.01); *H04Q 2209/40* (2013.01); *H04Q 2209/88* (2013.01)

(58) Field of Classification Search
CPC ............ B01D 46/44–46; B01D 46/429; B01D 46/0084–0098; F01M 11/10; F01M 11/12; F01M 2011/14–1493; F02M 35/0205–0208; F16H 57/0405; G01D 11/24–26
See application file for complete search history.

(56) References Cited

U.S. PATENT DOCUMENTS

| 5,036,698 A | 8/1991 | Conti |
| 5,315,877 A * | 5/1994 | Park ................... G01L 9/0075 73/718 |

(Continued)

FOREIGN PATENT DOCUMENTS

| DE | 102009018704 A1 | 10/2010 |
| DE | 102014015398 A1 | 4/2016 |

(Continued)

*Primary Examiner* — Alexander A Mercado

(57) ABSTRACT

A filter element sensor module having a housing, a sidewall of the housing including a recessed portion. The sensor module including a sensor assembly being provided within the housing about a sensor port interface being provided at one end of the housing. The sensor module also including processing circuitry being configured to receive signals from the sensor assembly and communication module, the communication module being configured to transmit one or more sensed parameters from the sensor assembly.

20 Claims, 9 Drawing Sheets

(51) Int. Cl.

| | | |
|---|---|---|
| *B01D 46/42* | (2006.01) | |
| *F01M 1/10* | (2006.01) | |
| *F01P 11/12* | (2006.01) | |
| *F01M 11/10* | (2006.01) | |
| *F01P 11/06* | (2006.01) | |
| *F02M 35/02* | (2006.01) | |
| *B01D 46/00* | (2006.01) | |
| *F01M 11/03* | (2006.01) | |
| *F01P 11/14* | (2006.01) | |
| *F16H 57/04* | (2010.01) | |
| *G08B 5/36* | (2006.01) | |

(56) References Cited

U.S. PATENT DOCUMENTS

| | | | |
|---|---|---|---|
| 5,980,618 A | 11/1999 | Holzmann et al. | |
| 7,279,140 B2 | 10/2007 | Myers et al. | |
| 8,097,067 B2 | 1/2012 | Fox et al. | |
| 2004/0079685 A1 | 4/2004 | Moscaritolo | B01D 29/603 210/85 |
| 2004/0079686 A1* | 4/2004 | Moscaritolo | B01D 29/603 210/90 |
| 2005/0154495 A1 | 7/2005 | Shah | |
| 2005/0247194 A1 | 11/2005 | Kang et al. | |
| 2009/0019946 A1 | 1/2009 | Mossman | |
| 2009/0211357 A1* | 8/2009 | Pinto | G01D 11/245 73/335.02 |
| 2009/0211455 A1 | 8/2009 | Guenther et al. | |
| 2009/0298192 A1 | 12/2009 | Parham et al. | |
| 2009/0311975 A1* | 12/2009 | Vanderaa | G01D 11/245 455/90.3 |
| 2011/0054811 A1 | 3/2011 | Contini et al. | |
| 2011/0153225 A1* | 6/2011 | Mangal | G01F 1/00 702/24 |
| 2011/0238331 A1 | 9/2011 | Moore et al. | |
| 2012/0084018 A1 | 4/2012 | Nevin et al. | |
| 2013/0031976 A1* | 2/2013 | Eckhardt | G01D 11/245 73/431 |
| 2013/0036804 A1 | 2/2013 | Uehara | |
| 2013/0048879 A1* | 2/2013 | Clark | G01D 11/245 250/492.1 |
| 2013/0067265 A1 | 3/2013 | Grayson | |
| 2013/0068106 A1 | 3/2013 | Hartmann et al. | |
| 2013/0146052 A1 | 6/2013 | Ding et al. | |
| 2013/0160542 A1* | 6/2013 | BUschnakowski | G01D 11/245 73/431 |
| 2013/0239813 A1 | 9/2013 | Rakow et al. | |
| 2013/0263640 A1 | 10/2013 | Rakow et al. | |
| 2013/0327335 A1 | 12/2013 | Ishikawa et al. | |
| 2014/0238126 A1* | 8/2014 | Vanderaa | G01D 11/24 73/431 |
| 2014/0283682 A1 | 9/2014 | Hamann et al. | |
| 2015/0016075 A1* | 1/2015 | Ruf | G01F 23/00 361/752 |
| 2015/0052978 A1 | 2/2015 | Beier | |
| 2015/0143901 A1* | 5/2015 | Matsui | G01D 11/24 73/431 |
| 2015/0177072 A1* | 6/2015 | Murphy | G01J 5/02 374/121 |
| 2016/0045854 A1 | 2/2016 | Hung | |
| 2016/0116392 A1 | 4/2016 | Carpenter et al. | |
| 2016/0121255 A1 | 5/2016 | Zhang et al. | |
| 2016/0187367 A1 | 6/2016 | Zhao et al. | |
| 2016/0215996 A1* | 7/2016 | Blair et al. | |
| 2016/0327416 A1* | 11/2016 | Gagne | G01L 19/144 |
| 2016/0370245 A1* | 12/2016 | Haldorsen | G01L 19/0618 |
| 2017/0048709 A1* | 2/2017 | Patel | B01D 46/009 |
| 2018/0017416 A1* | 1/2018 | Haldorsen | G01D 11/245 |
| 2018/0183482 A1* | 6/2018 | Rodriguez, Jr. | H04Q 1/02 |
| 2018/0331527 A1* | 11/2018 | Eastoe | E21B 33/0385 |
| 2018/0340392 A1* | 11/2018 | Eastoe | E21B 33/0385 |
| 2019/0044294 A1* | 2/2019 | Siacotos | G12B 9/00 |
| 2019/0063648 A1* | 2/2019 | Chen | G01D 11/245 |
| 2020/0003647 A1* | 1/2020 | Sugahara | G01K 1/08 |

FOREIGN PATENT DOCUMENTS

| | | |
|---|---|---|
| DE | 102014015529 A1 | 4/2016 |
| KR | 20030023891 A | 3/2003 |
| WO | 2015164237 A1 | 10/2015 |
| WO | 2016058672 A1 | 4/2016 |
| WO | 2016058673 A1 | 4/2016 |
| WO | 2016087302 A1 | 6/2016 |
| WO | 2016096786 A1 | 6/2016 |

* cited by examiner

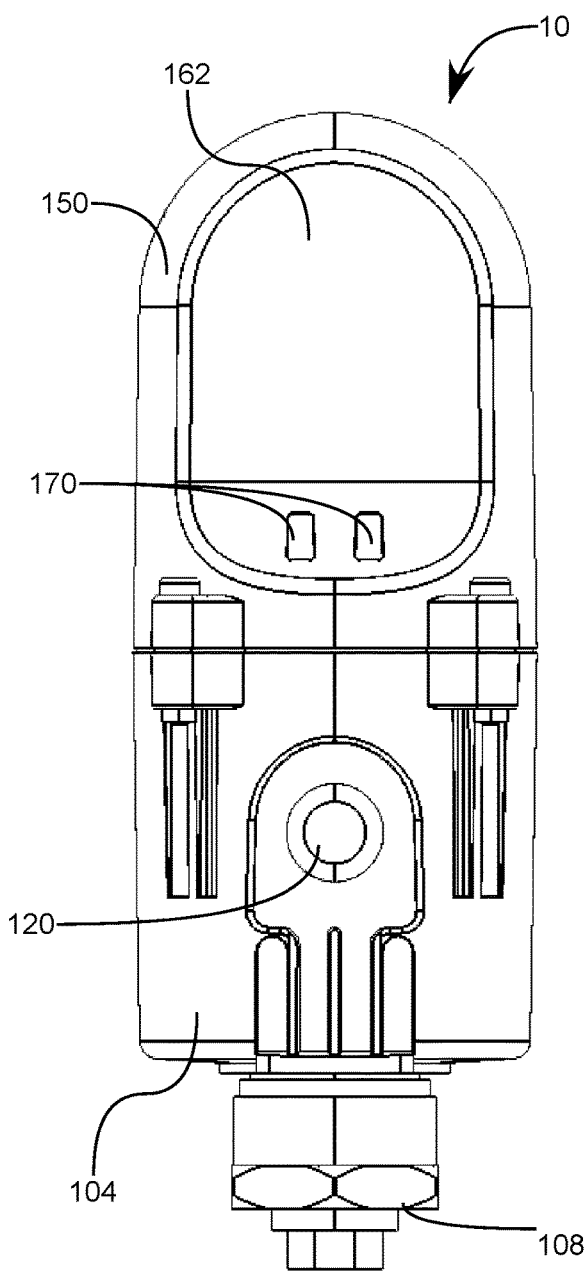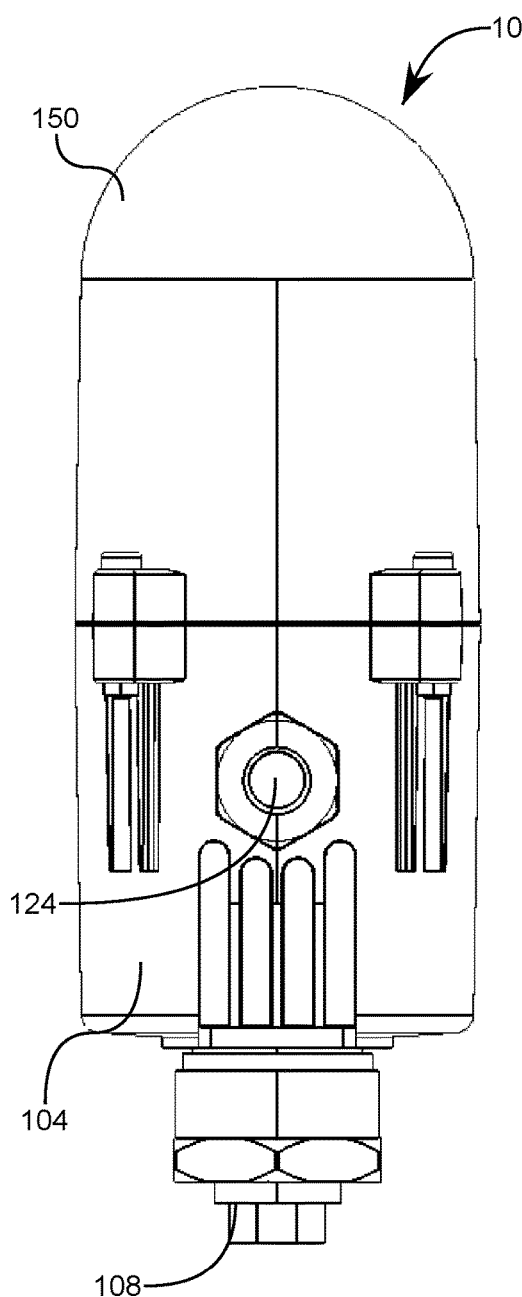
FIG. 3A
FIG. 3B

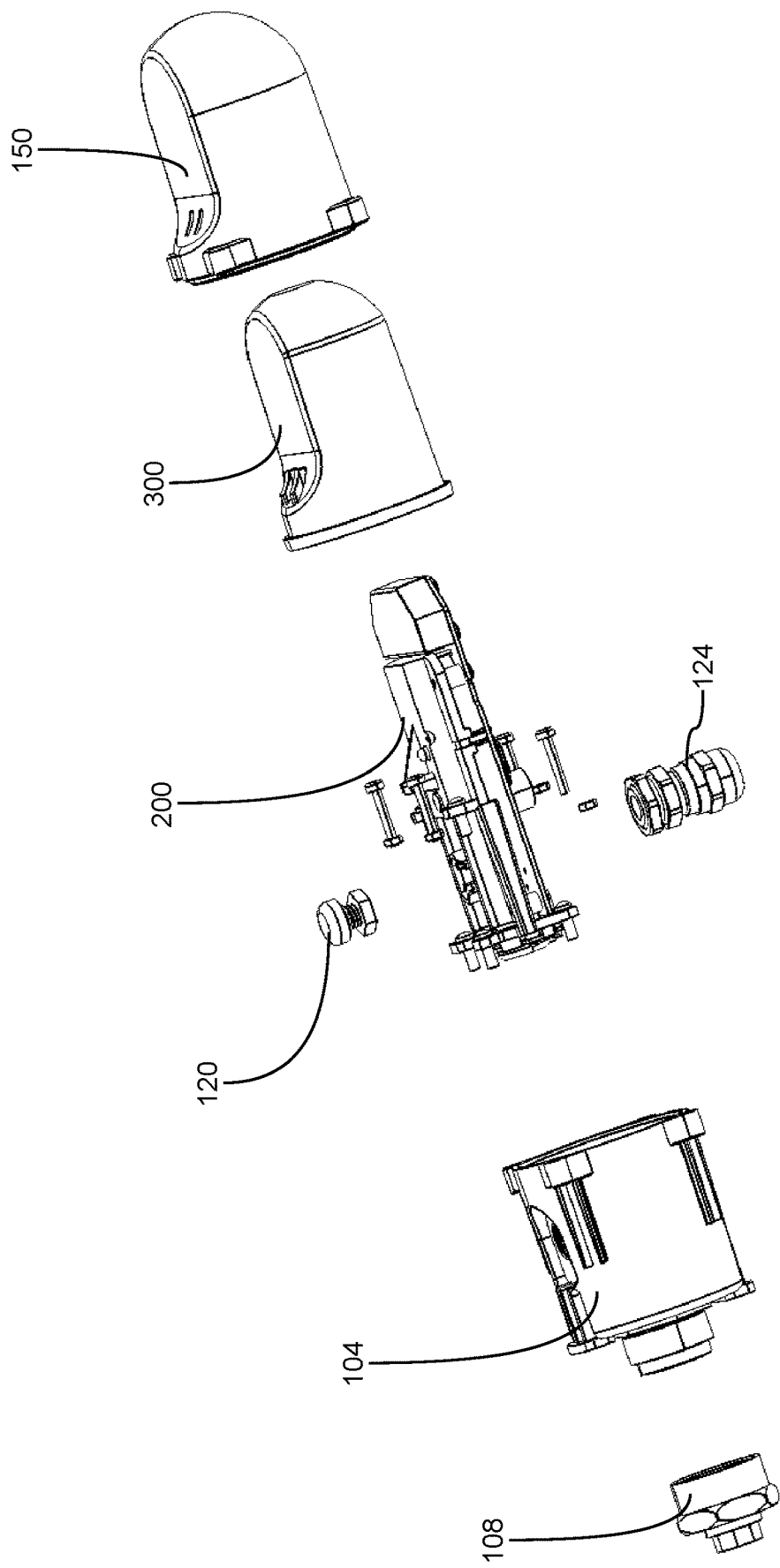

FILTER ELEMENT SENSOR MODULE HAVING PROCESSING AND WIRELESS COMMUNICATION CAPABILITIES

TECHNICAL FIELD

The present disclosure generally relates to the field of monitoring systems, and more particularly to a filtration monitoring system in large equipment and vehicles.

BACKGROUND

When using large motorized machinery, and particularly in the field of vehicles in extreme conditions, it is of particular advantage to ensure that air being utilized in their respective engines or motors be clean so as to avoid damaging the machine. It is well understood that these machines operate in an optimal fashion when the filter elements are regularly replaced or cleaned, and changing or cleaning the filter element prematurely, while ensuring smooth operation can result in unnecessary downtime, excess cost due to replacement cost, or damage to the filter element during unnecessary cleaning operations. Further, in particular environments, it can often require almost-constant supervision in order to determine precisely when a particular filter element needs replacement or cleaning. Changing a filter element too often result in extra downtime, damage to filter elements, and overall costs. Likewise, not changing at appropriate intervals can lead to damage.

While conventional filter elements typically have guidelines for when a filter element should be replaced, such as a particular timeline, these guidelines may or may not reflect actual filter element state or particle load depending on a wide variety of potential operating conditions. One of the intended benefits of the present application seeks to optimize filter element cleaning and replacement, while reducing unnecessary downtime.

SUMMARY OF THE INVENTION

Contemplated herein is a wireless filter element sensor module, the module including a housing. The housing can include a first portion and a second portion, the first portion can be provided having a generally annular shape and be provided with a sensor port interface about a first end and be open at a second end. The second portion of the housing can be hollow and be open at a first end closed with a partial dome about a second end. A sidewall of the second portion can be further provided with a recessed portion. As contemplated herein the first end of the second portion can correspond in shape about a perimeter thereof with a perimeter of the second end of the first portion so as to form an internal cavity in a mated state.

Within the housing a sensor assembly can be provided about the sensor port interface as well as processing circuitry. It will then be understood that the processing circuitry can then be configured to receive signals from the sensor assembly. The processing circuitry can also be configured to include, or be connected to, a communication module, the communication module can then be configured to transmit one or more sensed parameters from the sensor assembly.

The filter element sensor module can also be provided with a sealing member which can be configured to seal between the first portion of the housing and the second portion of the housing in the mated state.

In some embodiments, one or more apertures can be provided through a sidewall of the second portion of the housing which can be positioned so as to allow for light transmission through the housing from a plurality of indicator lights which can be provided on the processing circuitry, wherein the indicator lights can be configured to indicate a status of the filter element sensor module. In some such embodiments, the sealing member can be configured to be at least partially translucent, and extend across the one or more apertures, effectively sealing the interior of the housing through the one or more apertures from an external environment. In some such embodiments, the one or more apertures can be provided through the recessed portion.

In yet additional embodiments, the sealing member can extend along an entire interior portion of the second portion of the housing and coincide in shape therewith.

In yet additional embodiments, the processing circuitry can be provided on a circuit card, wherein the circuit card extends along a majority of a central portion of the internal cavity from within the first portion of the housing and into the second portion of the housing. In some such embodiments, the sealing member can further include one or more support fins configured to contact and support the circuit card within the second portion of the housing.

In some additional embodiments, particularly in embodiments requiring a differential environmental gradient between a sensed parameter and an ambient parameter, an ambient port can be provided through a sidewall of the first portion of the housing thus allowing sensing of the ambient parameter by an associated ambient sensor provided or connected to the circuit card.

In some embodiments, and as shown, the recessed portion of the second portion of the housing is provided as a flat surface.

Additionally, an external power connection interface can be provided through a sidewall of the first or second portion of the housing, wherein the external power connection interface can then be configured to allow a power connection to the processing circuitry and sensor module from an external source.

It will be appreciated that the wireless filter element sensor module as discussed above can be used in any number of filter systems, those systems including filter elements being provided within element housings. In some such embodiments the filter housings can be provided with one or more ports through which various fluid parameters can be sensed. Further, in some instances the wireless filter element sensor module can be connected directly to the port, or in some instances an adapter can be utilized which can be configured to be placed between the port and the sensor port interface thus allowing the wireless filter element sensor module to be placed remotely, particularly if placement is inconvenient or restrained due to adjacent components. In some such embodiments, the adapter can be formed of, or provided as, a flexible material.

It will be appreciated that the various components can transmit data in accordance with IEEE 802.11a/b/g/n standard, generally referred as a WIFI transceiver. Additionally, the various components can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, BLUETOOTH, and the like without departing from the scope and intent of the present disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein:

FIGS. 3A-C illustrate top bottom and side views of the wireless filter element sensor module of FIG. 2 in accordance with various aspects of the present invention;

FIG. 5 illustrates an exploded perspective side view the wireless filter element sensor module of FIG. 2 in accordance with various aspects of the present invention;

DETAILED DESCRIPTION

Figure 1:
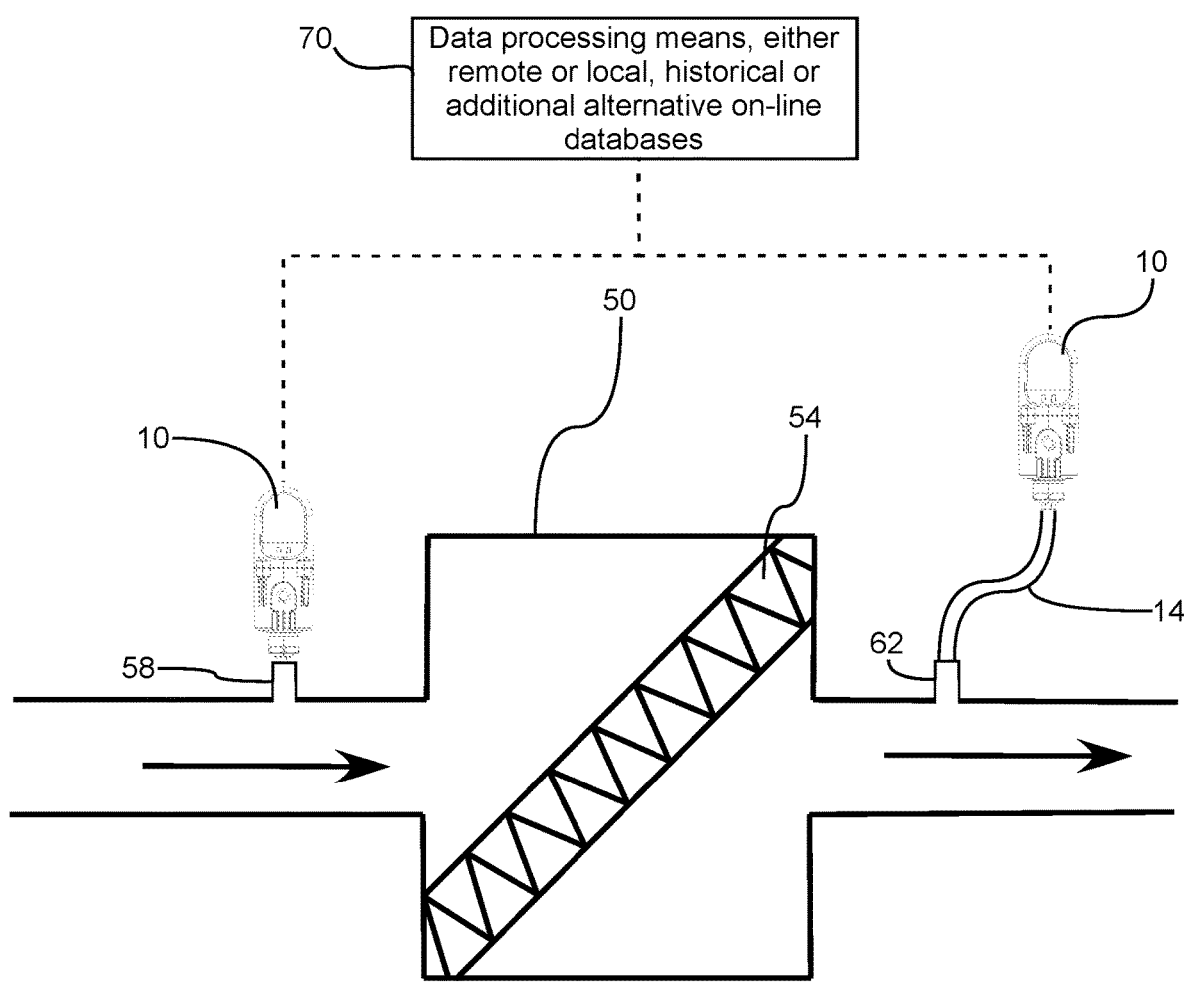
FIG. 1 illustrates an exemplary schematic illustrative an exemplary filtration system and various methods of use for a wireless filter element sensor module within said filtration system in accordance with various aspects of the present invention.
Figure 2:
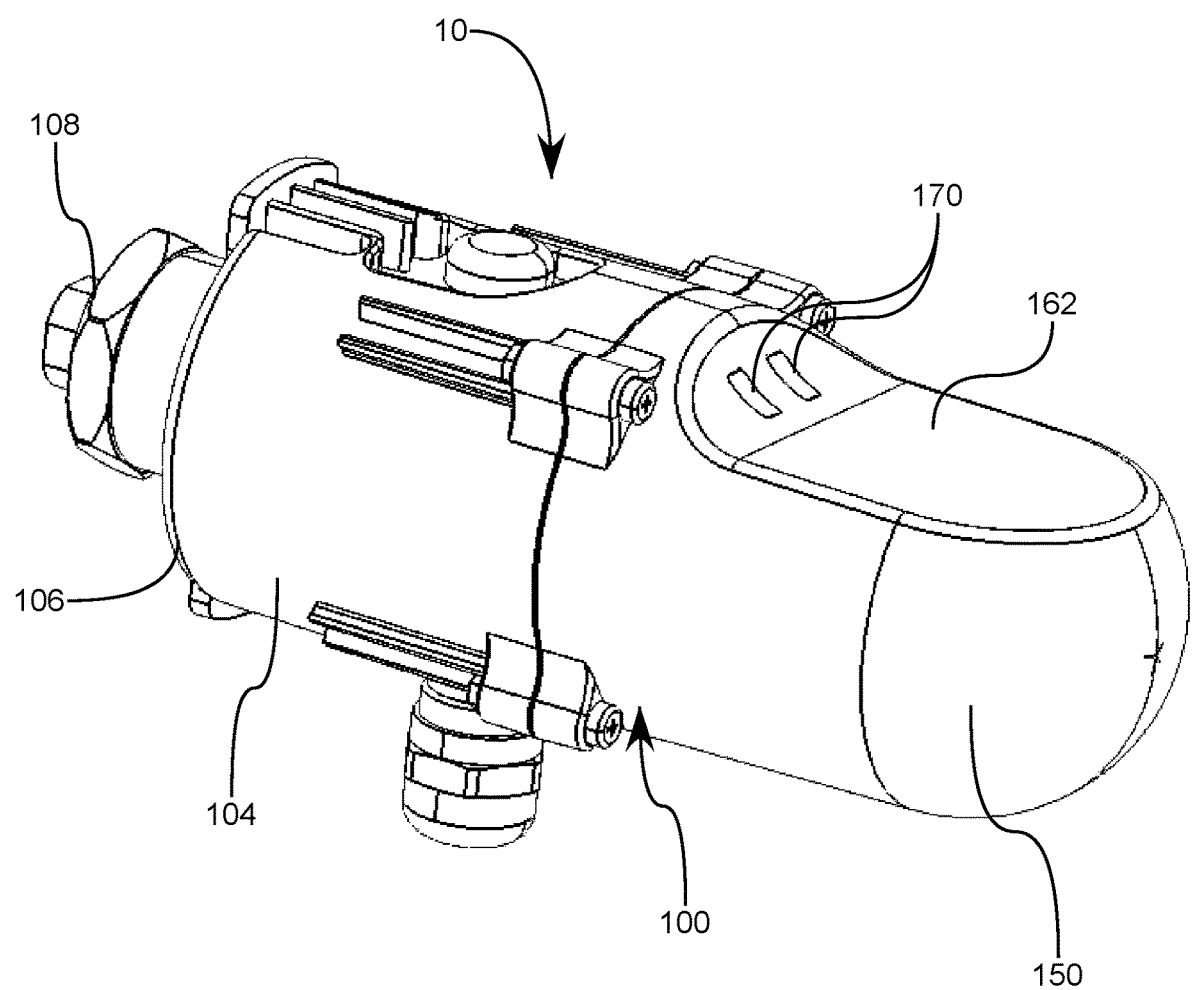
FIG. 2 illustrates a side isometric view of a wireless filter element sensor module illustrative of various aspects of the present invention.
Figure 3C:
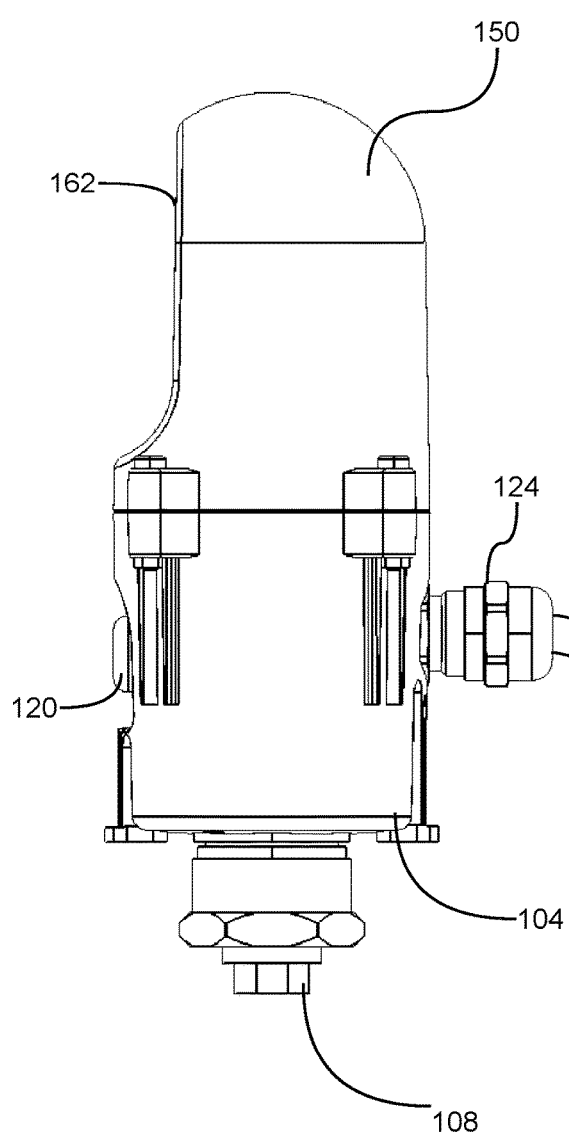
Figure 4:
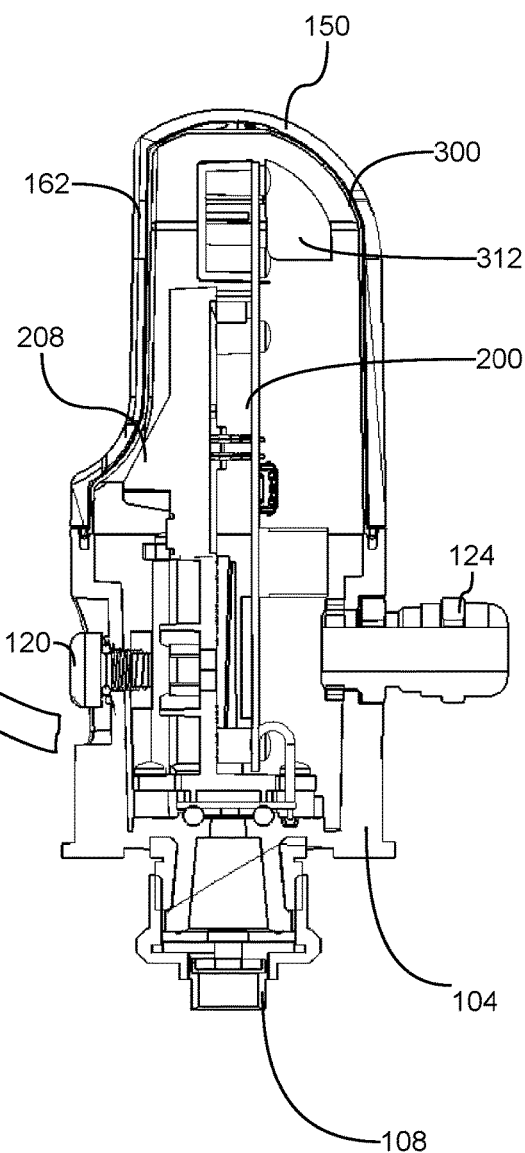
FIG. 4 illustrates a side cross-sectional view of the wireless filter element sensor module of FIG. 2 in accordance with various aspects of the present invention.

It will be appreciated by those having skill in the area of internal combustion engines, vehicles, both for transportation as well as equipment, harvesting, motors, etc. that proper filtration of lubricants as well as air can increase the life of particular motor greatly by reducing dust buildup and other contaminants from interfering with the operation of the machinery or vehicle. Further, a massive amount of time and productivity can be lost when a particular machine or motor fails or is merely down for maintenance during fluid and filter element changes. As such contemplated herein is a system which allows for real-time monitoring of filter media status using a wireless filter element sensor module configured to collect data regarding one or more particular filter elements, and transmit that data for analyzation which can aid in proper timing, predicting, and scheduling of required filter maintenance.

As such, contemplated herein is a wireless filter element sensor module 10, as illustrated in FIGS. 1-5. The wireless filter element sensor module 10 is configured to be attached or otherwise provided about a filter housing 50 which contains a filter media 54. In order to facilitate diagnostics, servicing, or performance assessments, the filter housing 50 can also be provided with one or more service ports 58 and 62 about an inlet side or an outlet side respectively. It will be appreciated that the filter housing 50 and the filter element 54 are shown as generic respective housings and elements, with the understanding that the invention as discussed herein can be applied to any fluid filtration commonly used in air, oil, liquid cooling, transmission, or other fluids as will be readily appreciated by those having skill in the art.

The system housing 50 can then be configured to receive one or more wireless filter element sensor modules 10 about the respective service ports 58 or 62 wherein the wireless filter element sensor modules 10 can then sense various flow or fluid parameters indicative of filter media state and transmit the sensed fluid parameters back to a controller which can then act as a local intermediary and processing unit which can perform local processing, or act as an intermediate data collection unit. It will be appreciated that the controller can be located about the equipment, or somewhere closer so as to allow for offline or local processing. Alternatively, the wireless filter element sensor modules 10 can be configured to transmit the sensed fluid parameters to a remote server over a wireless communication network. Some examples of wireless communication can include RFID, Bluetooth, radio, Wi-Fi, cellular, 3G, 4G, etc. The system can then be configured to analyze the data using processing circuitry so as to determine the state of the filter media, and determine or make suggestions regarding service intervals, replacement, cleaning, expected remaining useful life, time to failure, etc.

The wireless filter element sensor module 10 can include a housing 100 for containing and protecting electronic components and sensors contained therein. The housing 100 can include a first portion 104 and a second portion 150 which are separable but mate in a manner so as to provide an internal cavity for containing the electronic components and sensors therein.

Figure 6A:
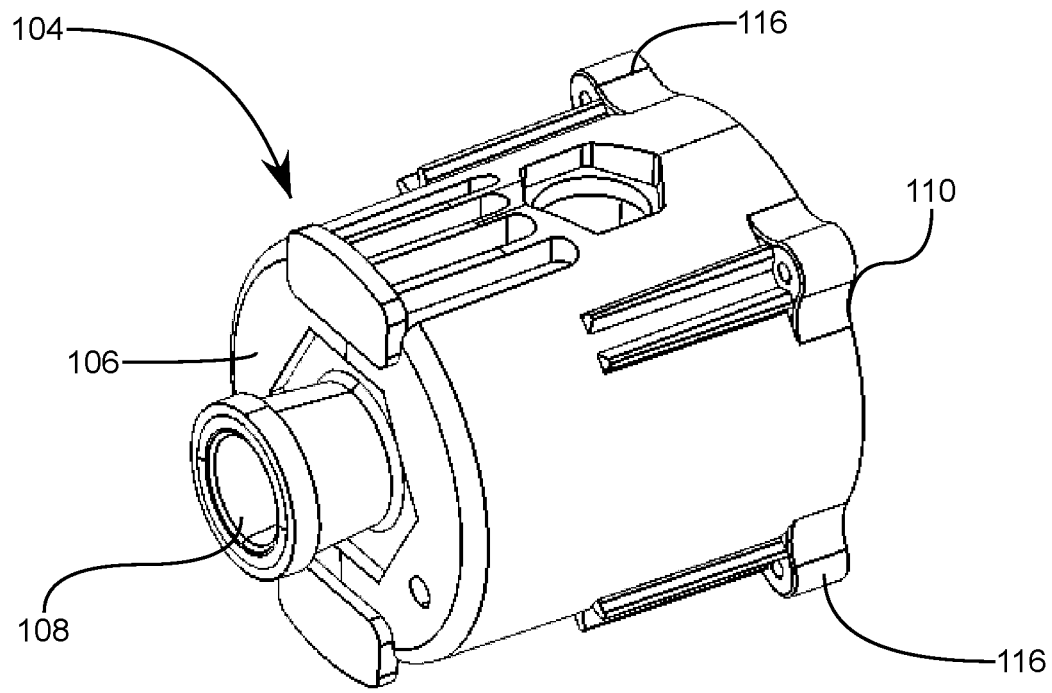
FIGS. 6A-B illustrate side perspective and open end interior views of a first portion of a housing for use with the wireless filter element sensor module of FIG. 2 in accordance with various aspects of the present invention.
Figure 6B:
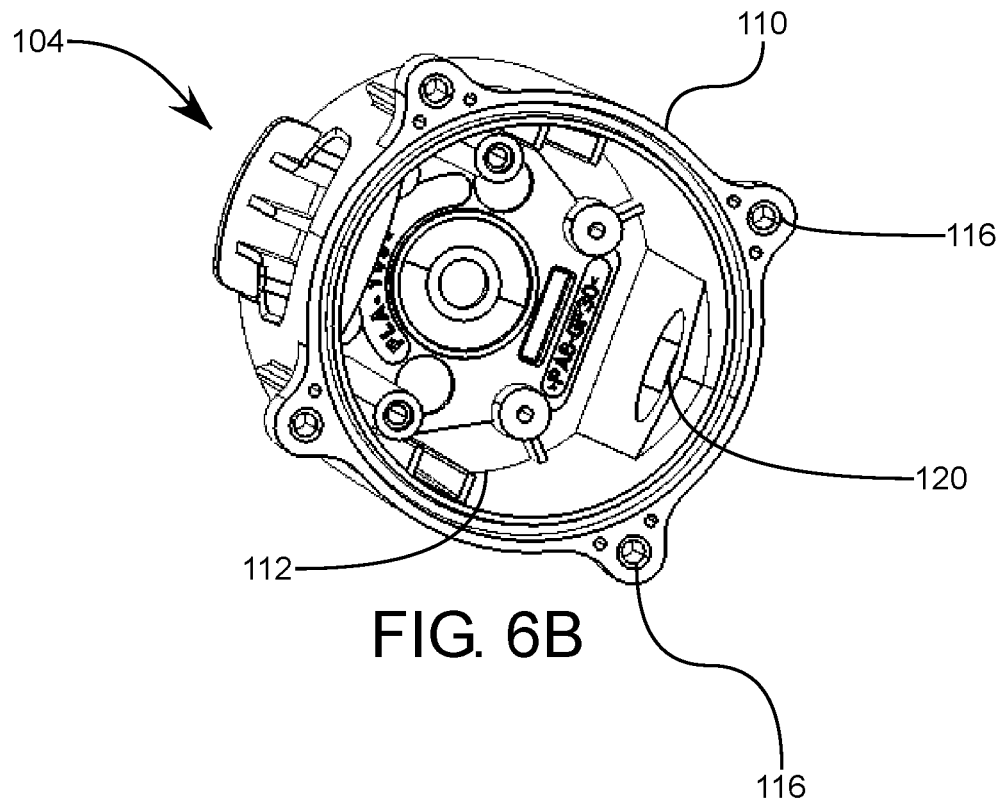

The first portion 104 of the housing 100, as illustrated in FIGS. 6A-B, can be provided having a generally annular shape having a thin sidewall and a central cavity 112 provided therein. The first portion 104 can also be provided with a sensor port interface 108 about a first end 106 and be open at a second end 110. The first portion can also be provided with one or more attachment means 116, which are illustrated herein as a flared outward portion having screw holes, which can be utilized for attaching or otherwise mating to the second portion. It will be appreciated that one of ordinary skill will recognize a plurality of suitable attachment means including clips, clamps, nuts, bolts, male or female threaded portions, bonding, adhesives, etc., and that the illustrated means is for exemplary purposes only.

Figure 7A:
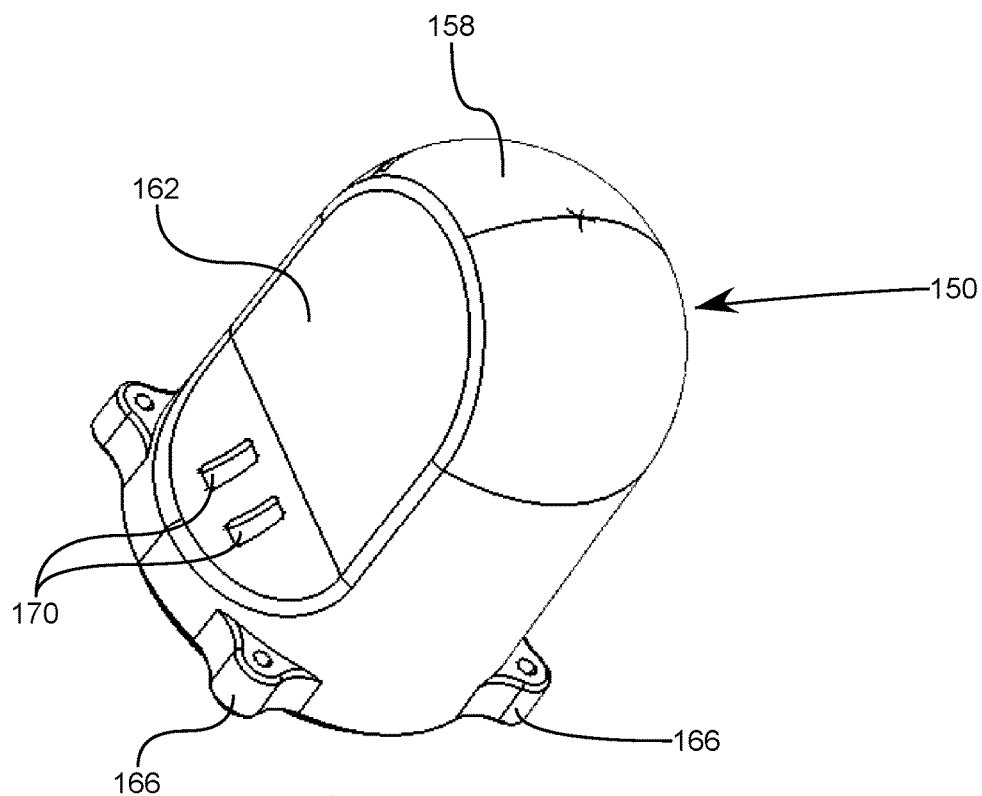
FIG. 7A-B illustrate side perspective and open end interior views of a second portion of a housing for use with the wireless filter element sensor module of FIG. 2 in accordance with various aspects of the present invention.
Figure 7B:
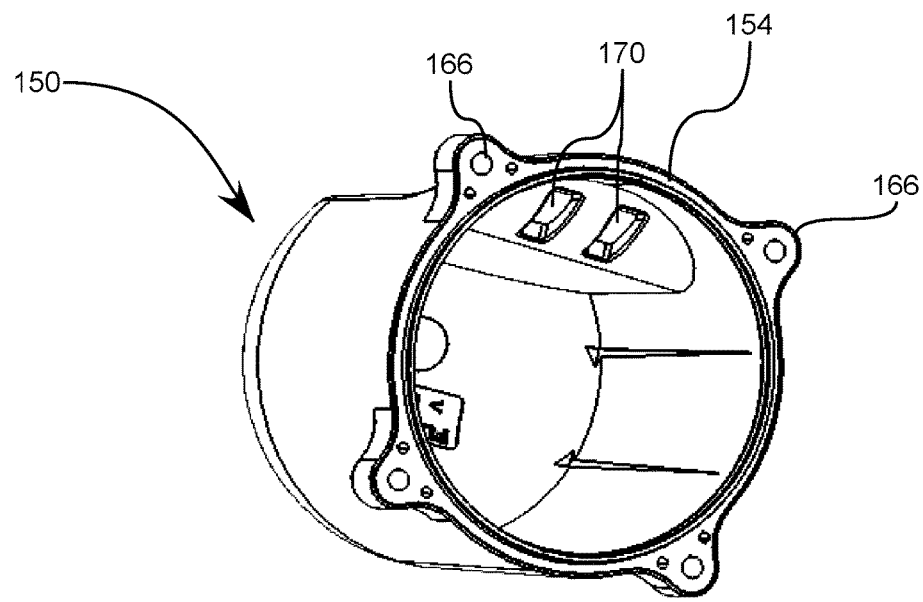
Figure 8A:
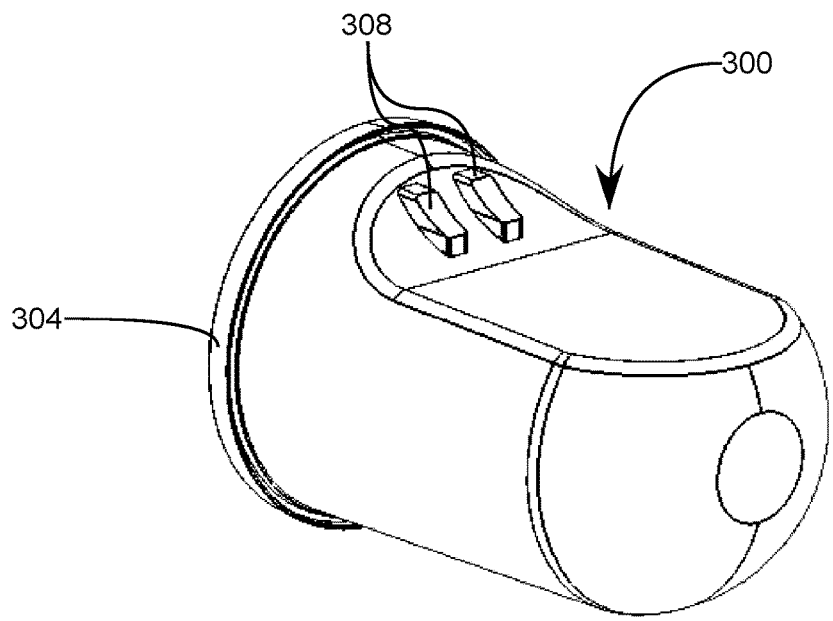
FIG. 8A-C illustrate side perspective and various open end interior views of a second portion of a housing for use with the wireless filter element sensor module of FIG. 2 in accordance with various aspects of the present invention.
Figure 8B:
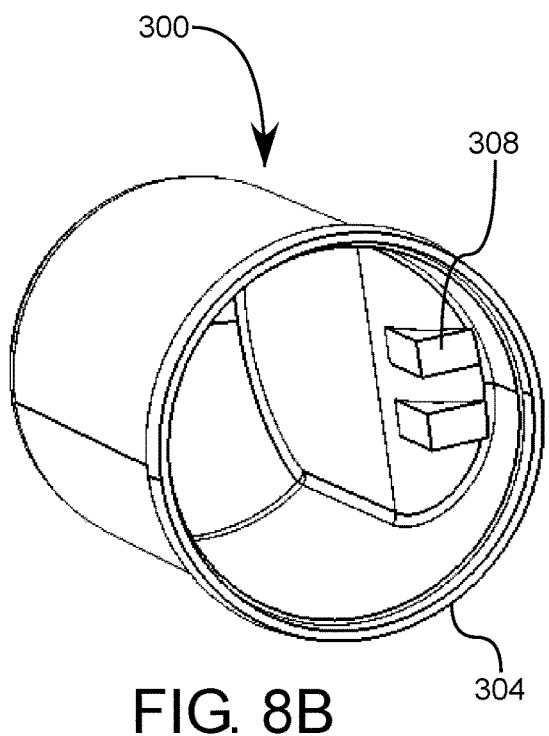
Figure 8C:
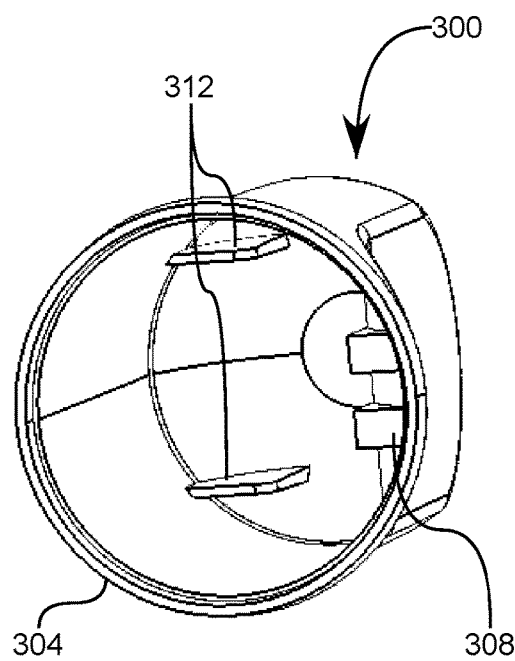

The second portion 150 of the housing 100, as illustrated in FIGS. 7A-B, can also be hollow, wherein the second portion 150 can be open at a first end 154 with a closed second end 158 which, as illustrated, can be provided as a partial dome about the second end.

A sidewall of the second portion 150 can also be provided with a recessed portion 162, wherein the recessed portion 162 can be configured to provide support to a circuit card 200 contained therein. The recessed portion can be provided as a planar or flat surface about an otherwise generally cylindrical sidewall so as to provide an edge about which a user can grasp during installation and removal. Additionally, the second portion can include one or more apertures 170 which can aide in viewing one or more associated indicator lights 204 provided on the circuit card 200. The indicator lights 204 being configured to provide information regarding an operational status of the wireless filter element sensor module 10.

The second portion 150 can also be provided with one or more corresponding attachment means 166, which are illustrated herein as a flared outward portion having screw holes, which can be utilized for attaching or otherwise mating to the first portion and in particular to the attachment means 116 of the first portion 104. It will be appreciated that one of ordinary skill will recognize a plurality of suitable attachment means including clips, clamps, nuts, bolts, male or female threaded portions, bonding, adhesives, etc., and that the illustrated means is for exemplary purposes only.

Figure 9A:
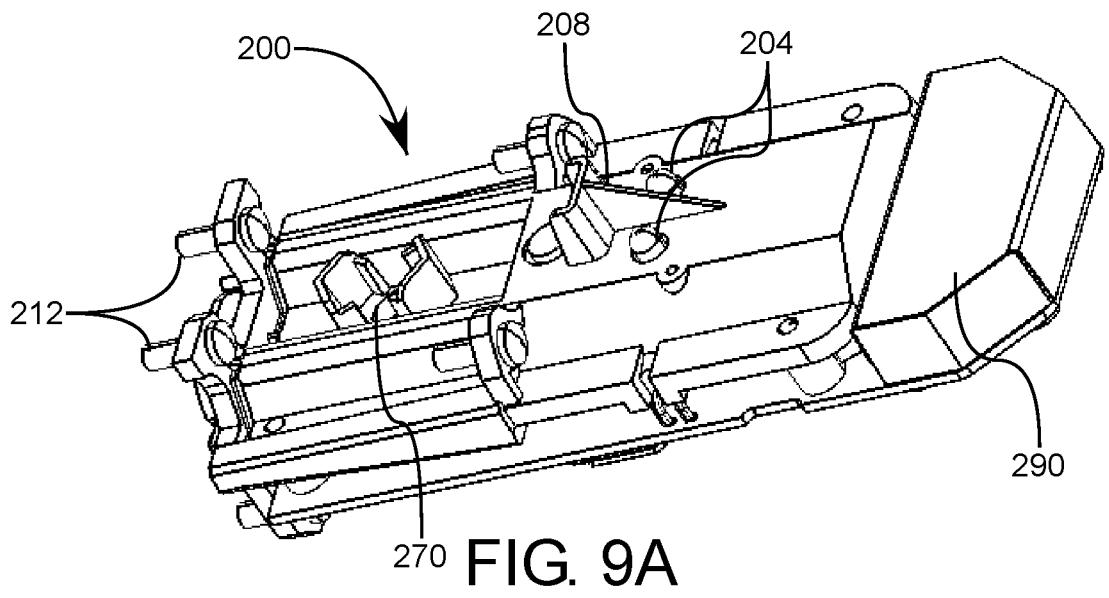
FIG. 9A-C illustrate various top and bottom perspective views of a sensor and circuit card assembly for use with the wireless filter element sensor module of FIG. 2 in accordance with various aspects of the present invention.
Figure 9B:
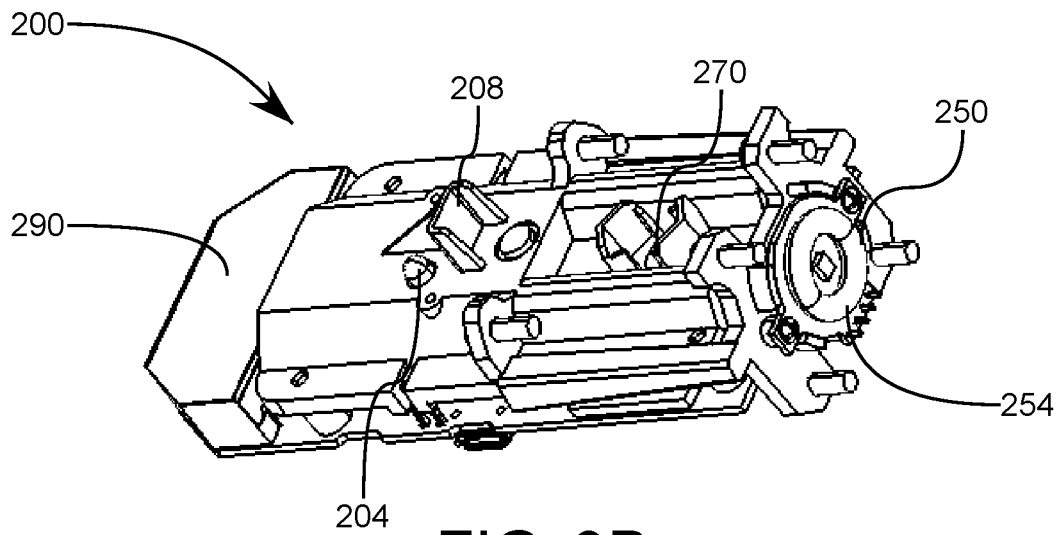
Figure 9C:
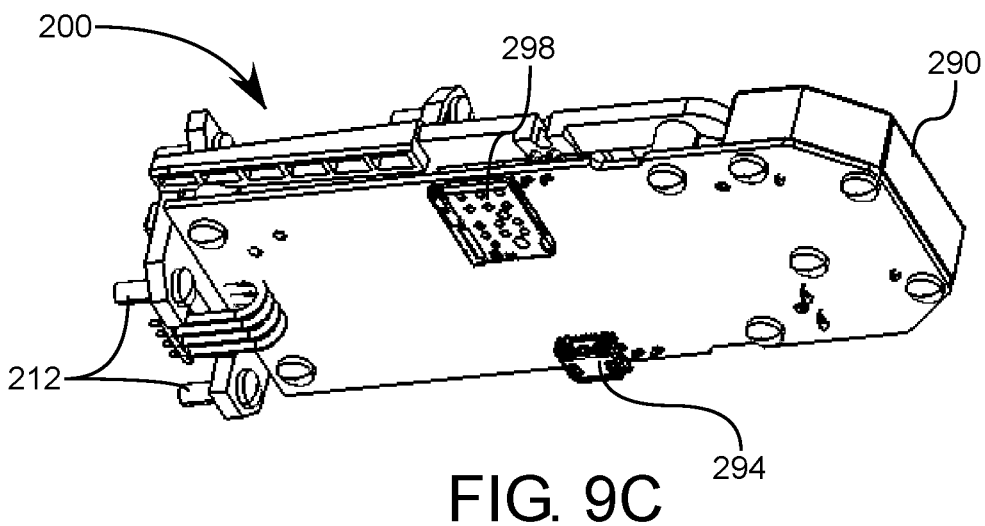

As contemplated herein the first end of the second portion can correspond in shape about a perimeter thereof with a perimeter of the second end of the first portion when mated so as to form an internal cavity in a mated state, wherein the internal cavity thereof can then house the circuit card 200, as shown in FIGS. 9A-C In some embodiments, the circuit card can be provided with a support fin 208 which corresponds in shape with an interior surface of a transition portion of the recessed portion, wherein the support fin 208 abuts against an interior wall of the second portion 150 of the housing 100 when installed within the internal cavity.

It will be appreciated that the circuit card 200 can also include one or more attachment means 212, such as screws, clips etc. which attach to an interior portion of the first portion 104 of the housing 100.

Within the housing 100, a sensor assembly 250 can be provided about the sensor port interface 108 which is also connected to processing circuitry provided about the circuit card 200. It will then be understood that the processing circuitry can then be configured to receive data or signals from the sensor assembly 250. The processing circuitry can also be configured to include, or be connected to, a communication module 290, the communication module 290 can then be configured to transmit one or more sensed parameters from the sensor assembly for remote processing by a remote server 70, and the data can be stored for later comparing on a historical database or an on-line database.

The sensor assembly 250 can also be provided with a sensor sealing member 254 which can be configured to seal between the internal cavity of the housing and the fluid flow within the filter housing. It will then be appreciated that the sensor assembly 250 is provided with access to the one or more ports of the filter housing so as to enable the filter assembly to sense various parameters of the fluid or flow within the housing at the respective port.

The filter element sensor module 10 can also be provided with a sealing member 300 which can be configured to seal between the first portion 104 of the housing 100 and the second portion 150 of the housing 100 in the mated state. In some embodiments, the sealing member 300 can be configured to be at least partially translucent, and extend across the one or more apertures 170, effectively sealing the interior cavity of the housing through the one or more apertures 170 from an external environment. In some such embodiments, the one or more apertures 170 can be provided through the recessed portion 162 or the housing 100. In yet additional embodiments, the sealing member 300 can extend along an entire interior portion of the second portion 150 of the housing 100 and coincide in shape therewith. In this manner, the likelihood of contaminants passing through the edge of the apertures and eventually fouling the electronic components provided on the circuit card will then be mitigated substantially. In this manner, the sealing member 300 can also be provided with one or more protrusions 308 which extend into the apertures 170 so as to give a flush and sleek look, while also increasing the tactile properties of the second portion 150 of the housing 100. The sealing member 300 can be formed of a rubber, silicone, composite, or any other suitable material. In some embodiments, a channel or groove can be provided about the first or second portion into which a flange 304 of the sealing member can securely seat and be compressed so as to form a tight seal.

In yet additional embodiments, the circuit card 200 can be configured and positioned so as to extend along a majority of a central portion of the internal cavity of the housing 100, as such it can extend from within the first portion 104 of the housing 100 and into the second portion 150 of the housing 100. In some such embodiments, the sealing member 300 can further include one or more support fins 312 which are then configured to contact and support the circuit card 200 within the second portion 150 of the housing 100. Particularly when the sealing member 300 is formed of silicone or some other malleable substance, the fins 312 can provide a certain degree of vibration and shock absorption so as to minimize wear as well as minimize processor interruption caused by such vibrations or shock.

In some additional embodiments, particularly in embodiments requiring a differential environmental gradient between a sensed parameter through the filter media and an ambient parameter, an ambient port 120 can be provided through a sidewall of the first portion 104 of the housing 100 thus allowing sensing of the ambient parameter by an associated ambient sensor 270 provided or connected to the circuit card 200. Examples of an ambient parameter can be ambient pressure, humidity, temperature, or virtually any useful ambient parameter.

Additionally, an external power connection interface 124 can be provided through a sidewall of the first or second portion of the housing 100. In such embodiments, the external power connection interface 124 can then be configured to allow a power connection to the processing circuitry and sensor module from an external source 126.

It will be appreciated that the wireless filter element sensor module 10 as discussed above can be used in any number of filter systems, those systems including filter elements 54 being provided within element housings 50. In some such embodiments, the filter housings can be provided with ports 58 or 62 either upstream or downstream from the filter element 54. It will be further understood that in some instances the wireless filter element sensor module can be connected directly to the port as shown on the upstream side of FIG. 1, or in some instances an adapter 14 can be utilized which can be configured to be placed between the port and the sensor port interface thus allowing the wireless filter element sensor module 10 to be placed relatively remotely, particularly if placement is inconvenient or restrained due to adjacent components. In some such embodiments, the adapter 14 can be formed of, or provided as, a flexible material so as to conform to the needs of the particular space available.

In some embodiments, and as discussed above, the wireless filter element sensor module 10 can be configured to process sensed data locally, and transmit or otherwise provide alerts to local control systems or users. In yet additional embodiments, the wireless filter element sensor module 10 can instead transmit the sensed data directly to a remote location for processing and alert generation. It will also be understood that in certain instances the transmission capabilities of the wireless filter element sensor module 10 can be limited, such as on equipment in obscure locations wherein no data or uplink signal can be established for data transmission. In such instances, the wireless filter element sensor module 10 can be configured to include non-transitory computer-readable media which can temporarily store sensed data and wait for a proper signal or link connection for later upload.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

It will be appreciated that the communication module 290 of the wireless filter element sensor module 10 can transmit data in accordance with IEEE 802.11a/b/g/n standard, generally referred as a WIFI transceiver. Additionally, the wireless filter element sensor module 10 can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, BLUETOOTH, and the like without departing from the scope and intent of the present disclosure.

The circuit card can be further provided with a sim card slot 298 for cellular or 3G or 4G data transmission. Additionally, for purposes of data transfer, as well as software debugging, a USB port 294 can be provided which can allow for a data link and transfer as appropriate. In some embodiments, the circuit card 200 can also be powered through a USB connection to said port 294.

In some embodiments, the apertures 170 can be filled with an opaque material rather than be filled with the sealing member 300.

Alternatively, the second portion 150 of the housing 100 can instead be overmolded over a translucent shell so as to allow for viewing of the indicator lights 204 therethrough. In yet additional embodiments, the second portion 150 can be formed entirely of a translucent material and the apertures omitted.

In various aspects of the present invention each of the sensor ports or interfaces can have sealing structures provide thereto so as to prohibit particulates or contaminants from passing into the housing therethrough. The housing 100 can also be provided with various ribs, fins, and connection structures so as to provide adequate support and mating of the circuit card therein.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

LIST OF ELEMENTS

10—Filter Element Sensor Module
14—Adapter
50—Filter Housing
54—Filter Media
58—Port
62—Port
70—Remote Server
100—Housing
104—First Portion (of Housing 100)
106—First End (of First Portion 104)
108—Sensor port interface
110—Second End (of First Portion 104)
112—Central Cavity
116—Attachment Means
120—Ambient Port
124—External Power Connection Interface
126—External Source
150—Second Portion (of Housing 100)
154—First End (of Second Portion 150)
158—Second End (of Second Portion 150)
162—Recessed Portion
166—Corresponding Attachment Means (to 116)
170—Apertures
200—Circuit Card
204—Indicator Lights
208—Support Fin
212—Attachment Means
250—Sensor Assembly
254—Sealing Member
270—Ambient Sensor
290—Communication Module
294—Port (such as USB port)
298—Sim Card Slot
300—Sealing member
304—Flange
308—Protrusion
312—Fin While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

What is claimed:

1. A filter element sensor module, the module comprising:
a housing, the housing having a first portion and a second portion, the first portion having an annular sidewall and being provided with a sensor port interface at a first end and being open at a second end, the second portion being open at a first end and being closed at a second end, an annular sidewall of the second portion having a recessed portion, wherein a perimeter of the first end of the second portion corresponds in shape with a perimeter of the second end of the first portion so as to form an internal cavity in a mated state;
a sensor assembly being provided adjacent the sensor port interface being provided within the housing;
processing circuitry being configured to receive signals from the sensor assembly;
a communication module being operatively connected to the processing circuitry, the communication module being configured to wirelessly transmit one or more sensed parameters from the sensor assembly; a sealing member being configured to seal between the first portion of the housing and the second portion of the housing in the mated state;
one or more apertures provided through the annular sidewall of the second portion of the housing; and
a plurality of indicator lights being provided on the processing circuitry being configured to indicate a status of the filter element sensor module;
wherein the sealing member is configured to be translucent, and extend across the one or more apertures, effectively sealing the internal cavity of the housing through the one or more apertures from an external environment.

2. The filter element sensor module of claim 1, wherein the one or more apertures are provided through the recessed portion.

3. The filter element sensor module of claim 1, wherein the processing circuitry is provided on a circuit card, wherein the circuit card extends along a majority of a central portion of the internal cavity from within the first portion of the housing and into the second portion of the housing.

4. The filter element sensor module of claim 3, wherein the sealing member extends along an entire interior portion of the second portion of the housing.

5. The filter element sensor module of claim 4, wherein the sealing member further includes one or more support fins configured to contact and support the circuit card.

6. The filter element sensor module of claim 1, further comprising:
an ambient port provided through the annular sidewall of the first portion of the housing.

7. The filter element sensor module of claim 1, wherein the recessed portion of the second portion of the housing is provided as a flat surface.

8. The filter element sensor module of claim 1, further comprising: an external power connection interface provided through the annular sidewall of the first or second portion of the housing, the external power connection configured to allow power connection to the processing circuitry and sensor module.

9. A filter element sensor system, the system comprising:
a filter element being provided within an element housing;
at least one port being provided adjacent the element housing
at least one sensor module, each of the at least one sensor modules further comprising:
a sensor module housing, the sensor module housing having a first portion and a second portion, the first portion having an annular sidewall and being provided with a sensor port interface at a first end and being open at a second end, the second portion being open at a first end and being closed at a second end, an annular sidewall of the second portion having a recessed portion, wherein a perimeter of the first end of the second portion corresponds in shape with a perimeter of the second end of the first portion so as to form an internal cavity in a mated state, wherein the sensor port interface is configured to attach to the at least one port;
a sensor assembly being provided adjacent the sensor port interface being provided within the sensor module housing;
processing circuitry being configured to receive signals from the sensor assembly;
a sealing member being configured to seal between the first portion of the sensor module housing and the second portion of the sensor module housing in the mated state
a communication module being operatively connected to the processing circuitry, the communication module being configured to wirelessly transmit one or more sensed parameters corresponding to a state of the filter element as detected by the sensor assembly;
a remote server having processing circuitry being configured to receive, store, and analyze the one or more sensed parameters;
a user interface configured to provide filter status information based on the sensed parameters to a user;
one or more apertures provided through the annular sidewall of the second portion of the sensor module housing; and
a plurality of indicator lights being provided on the processing circuitry being configured to indicate a status of the filter element sensor module; and
wherein the sealing member is configured to be translucent, and extend across the one or more apertures, effectively sealing the internal cavity of the sensor module housing through the one or more apertures from an external environment.

10. The filter element sensor system of claim 9, wherein the one or more apertures are provided through the recessed portion.

11. The filter element sensor system of claim 9, wherein the processing circuitry is provided on a circuit card, wherein the circuit card extends along a majority of a central portion of the internal cavity from within the first portion of the sensor module housing and into the second portion of the sensor module housing.

12. The filter element sensor system of claim 11, wherein the sealing member extends along an entire interior portion of the second portion of the sensor module housing.

13. The filter element sensor system of claim 12, wherein the sealing member further includes one or more support fins configured to contact and support the circuit card.

14. The filter element sensor system of claim 9, further comprising:
an ambient port provided through the annular sidewall of the first portion of the sensor module housing.

15. The filter element sensor system of claim 9, wherein the recessed portion of the second portion of the sensor module housing is provided as a flat surface.

16. The filter element sensor system of claim 9, further comprising:
an adapter configured to be placed between the at least one port and the sensor port interface of the first portion of the sensor module housing, the adapter being configured to space the sensor module away from the at least one port.

17. The filter element sensor system of claim 16, wherein the adapter is flexible.

18. The filter element sensor module of claim 9, further comprising:
an external power connection interface provided through the annular sidewall of the first or second portion of the sensor module housing, the external power connection configured to allow power connection to the processing circuitry and sensor module.

19. A filter element sensor system, the system comprising:
a filter element being provided within an element housing;
a port being provided adjacent the element housing;
a plurality of sensor modules, each sensor module further comprising:
a sensor module housing, the sensor module housing further comprising:
a first portion;
a second portion, the first portion having an annular sidewall and being provided with a sensor port interface at a first end and being open at a second end, the second portion being open at a first end and being closed at a second end, an annular sidewall of the second portion having a recessed portion, wherein a perimeter of the first end of the second portion corresponds in shape with a perimeter of the second end of the first portion so as to form an internal cavity in a mated state, wherein the sensor port interface is configured to attach to the port, and wherein the recessed portion of the second portion of the sensor module housing is provided as a flat surface;
one or more apertures provided through the annular sidewall of the second portion of the sensor module housing; and
a plurality of indicator lights being provided on the processing circuitry being configured to indicate a status of the filter element sensor module;
a sensor assembly being provided adjacent the sensor port interface being provided within the sensor module housing;
processing circuitry being configured to receive signals from the sensor assembly;
a sealing member being configured to seal between the first portion of the sensor module housing and the second portion of the sensor module housing in the mated state;
a communication module being operatively connected to the processing circuitry, the communication module being configured to wirelessly transmit one or more sensed parameters corresponding to a state of the filter element as detected by the sensor assembly, wherein the sealing member is configured to be translucent, and extend across the one or more apertures, effectively sealing the interior of the sensor module housing through the one or more apertures from an external environment; and
an external power connection interface provided through the annular sidewall of the first or second portion of the sensor module housing, the external power connection configured to allow power connection to the processing circuitry and sensor module;
a remote server having processing circuitry being configured to receive, store, and analyze the one or more sensed parameters;
a user interface configured to provide filter status information based on the sensed parameters to a user;
wherein the processing circuitry is provided on a circuit card, wherein the circuit card extends along a majority of a central portion of the internal cavity from within the first portion of the sensor module housing and into the second portion of the sensor module housing; and
wherein the sealing member further includes one or more support fins configured to contact and support the circuit card.

20. A filter element sensor module, the module comprising:
a housing, the housing having a first portion and a second portion, the first portion having an annular sidewall and being provided with a sensor port interface at a first end and being open at a second end, the second portion being open at a first end and being closed at a second end, an annular sidewall of the second portion having a recessed portion, wherein a perimeter of the first end of the second portion corresponds in shape with a perimeter of the second end of the first portion so as to form an internal cavity in a mated state;
a sensor assembly being provided adjacent the sensor port interface being provided within the housing;
processing circuitry being configured to receive signals from the sensor assembly;
a communication module being operatively connected to the processing circuitry, the communication module being configured to wirelessly transmit one or more sensed parameters from the sensor assembly; a sealing member being configured to seal between the first portion of the housing and the second portion of the housing in the mated state;
wherein the processing circuitry is provided on a circuit card, wherein the circuit card extends along a majority of a central portion of the internal cavity from within the first portion of the housing and into the second portion of the housing; and
wherein the sealing member extends along an entire interior portion of the second portion of the housing.

* * * * *